W. E. SAXE.
SETTLING TANK.
APPLICATION FILED OCT. 11, 1915.
1,265,256.
Patented May 7, 1918.
2 SHEETS—SHEET 2.
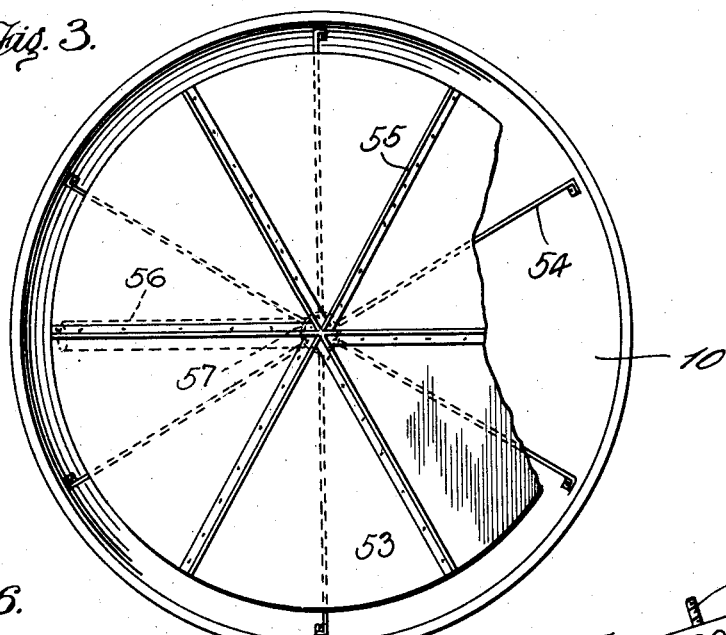
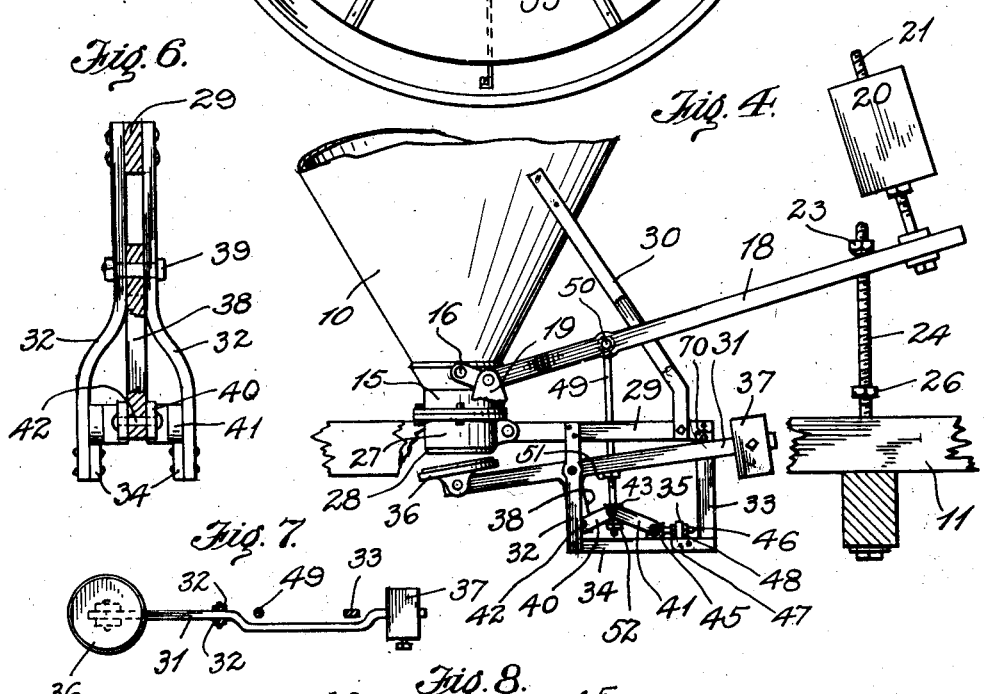
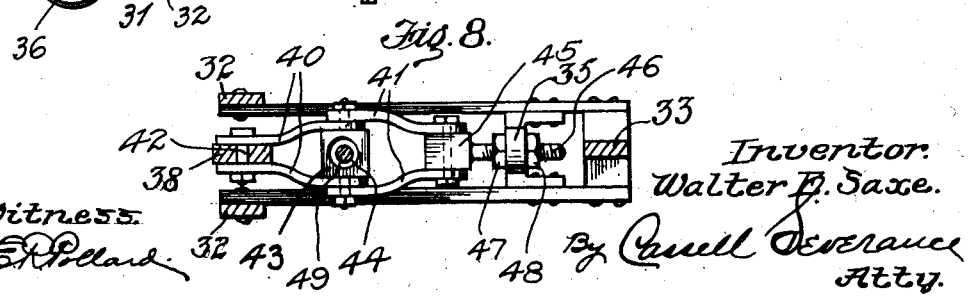
Inventor.
Walter E. Saxe.

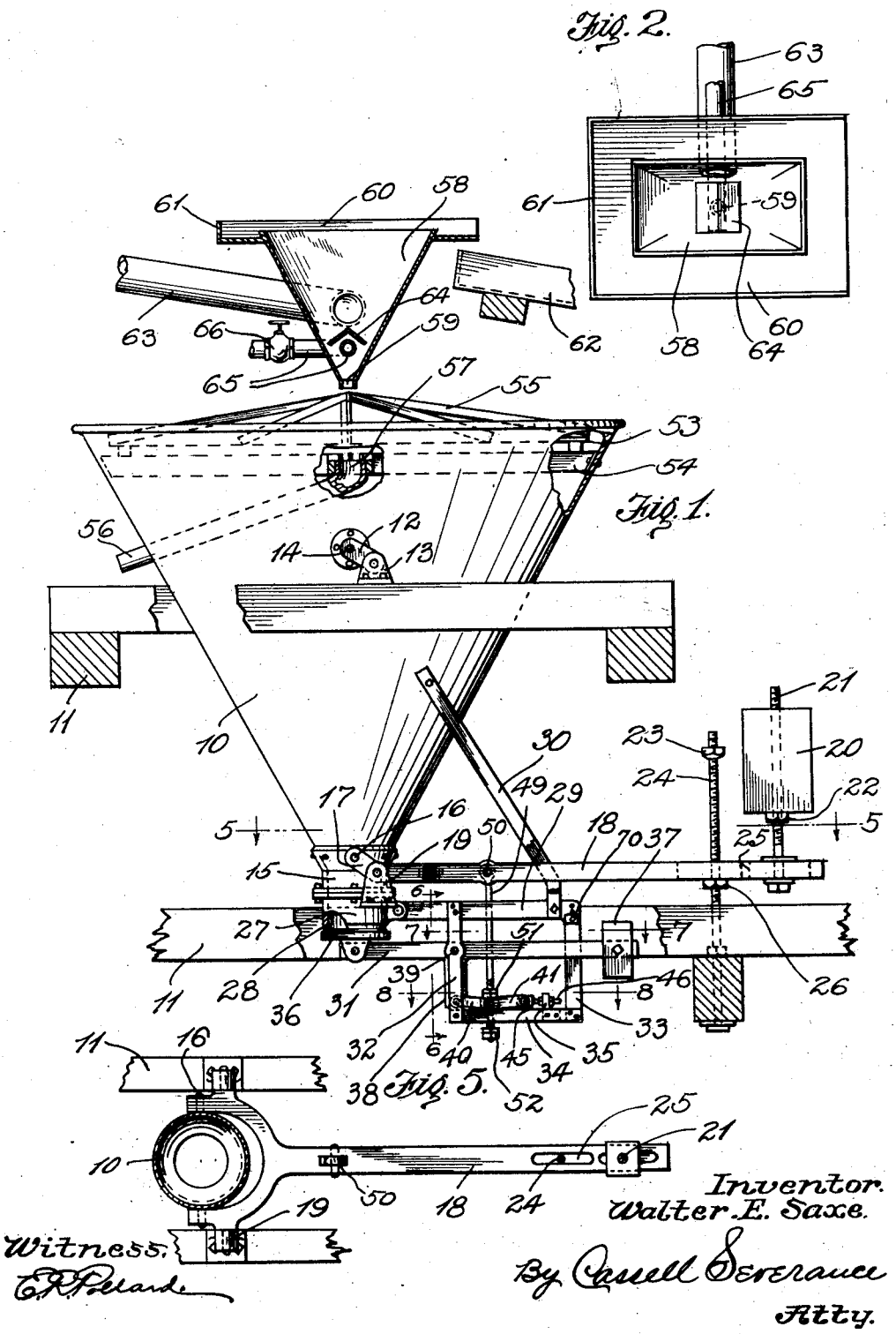

UNITED STATES PATENT OFFICE.

WALTER E. SAXE, OF INGLEWOOD, CALIFORNIA.

SETTLING-TANK.

1,265,256.

Specification of Letters Patent.

Patented May 7, 1918.

Application filed October 11, 1915. Serial No. 55,313.

*To all whom it may concern:*

Be it known that I, WALTER E. SAXE, a citizen of the United States, residing at Inglewood, in the county of Los Angeles and State of California, have invented certain new and useful Improvements in Settling-Tanks, of which the following is a specification.

This invention relates to improvements in settling tanks or mechanisms in which dirt or foreign materials may be separated from solid materials, and especially from sand which it is desired to use in a clean condition.

It is an object of the invention to provide an automatically operating tank or settling receptacle, which is provided with an outlet controlling means, so constructed that a given weight of material will have opportunity to collect in the tank, before the outlet controlling means is operated for discharging any of the contents of the settling tank.

It is also an object of the invention to provide a settling tank with a discharge controlling valve mechanism adapted to remain closed until a predetermined weight of material has accumulated in the device, at which time the said valve mechanism is opened with a positive action for discharging the materials.

It is a further object of the invention to mount a settling tank so as to have a lever support arranged to operate with a differential leverage, whereby when the tank is depressed for discharging its contents it will move with a positive action, and after discharging will be returned to its normal position again with a positive action.

It is a still further object of the invention to provide a settling tank with a discharge controlling valve operated by a self locking toggle mechanism whereby it is positively opened or closed without danger of stopping at intermediate points.

With these and other objects in view the invention comprises certain novel constructions, combinations and arrangement of parts as will be hereinafter more fully described and claimed. In the accompanying drawing forming a part of this specification:

Figure 1 is a side elevation of the settling tank forming the subject matter of this invention, portions thereof and of its supporting means being broken away to better reveal the structure.

Fig. 2 is a top plan view of the hopper for delivering materials into the upper portion of the tank.

Fig. 3 is a top plan view of a settling tank, a portion of the distributing floor or cone being broken away.

Fig. 4 is a side elevation of the discharge valve mechanism shown in open position, a portion of the supporting frame being broken away and some of it shown in section.

Fig. 5 is a detail sectional view taken upon the line 5—5 of Fig. 1.

Fig. 6 is an enlarged detail sectional view taken upon the line 6—6 of Fig. 1.

Fig. 7 is an enlarged detail sectional view taken upon the line 7—7 of Fig. 1.

Fig. 8 is an enlarged detail sectional view taken upon the line 8—8 of Fig. 1.

The settling tank of the present invention is designed for the separation of liquids, wash water, dirt and other foreign substances from solid materials, and particularly from sand, when it is desired to collect the same in a clean condition for certain uses. While the mechanism is especially well adapted for washing and purifying sand, it is also capable of separating solvents or other liquids from crushed ore products, slimes or the like as the mechanism can be employed as a classifier for treating ores as well as sands. Preferred embodiments of the features of the invention have been illustrated in the accompanying drawings and the said features will now be more specifically described reference being had thereto. In said drawing 10 indicates a settling tank, which may be of any desired shape but is generally conical as shown in the drawings and is adapted to be supported upon any suitable frame as 11. The tank is so mounted that it may rise and fall under different weights of material and is preferably so supported that it will remain in vertical position when it rises or falls. The upper portion of the tank 10 is movably supported in the upper portion of the frame 11 by means of links 12 which are pivoted upon bearing standards 13 carried by the upper cross bars of said frame 11. The upper ends of the links 12 are pivotally connected with the sides of the tank 10 by means of trunnions 14 secured to the side walls of the said tank. The lower end of the tapered tank 10 is secured in a sleeve casting 15 having a flange riveted to the said tank. Trunnions 16 projecting from the sides of this casting engage the upwardly bent arms 17 of the bifurcated end of a lever 18. The lever 18 is fulcrumed on brackets or standards 19 which rise from the lower cross bars of the said frame 11 as clearly shown in Fig. 1 of the drawings. The up and down movement of the said tank 10 is thus secured upon the principle of the parallel ruler movement. The lever 18 is made of considerable length, extending well to one side of the tank 10 and having an adjustable counterbalance weight 20 upon the outer end thereof. The weight is adjustably held upon said lever in any desired manner, a simple form being shown in the drawing and consisting of a vertical screw threaded rod or standard 21, secured at its lower end to the lever 18. The said screw threaded rod preferably extends through an opening in the weight 20 and said weight is adjustably supported thereon by means of a nut 22. The distance of the weight from the lever 18 may thus be adjusted for securing the desired differential action in the support of the tank. The standard 21 engages a slot in the end of the lever 18 so that it may be secured at different distances from the fulcrum points, for securing the proper balancing of the tank 10. The formation of the lever with its upturned tank supporting arms 17, and the counterbalanced weight 20 adjustably secured thereon makes it possible to secure a differential action in the movement of the tank. By reference to Figs. 1 and 4 it will be understood that as the weight 20 is lifted by the upward movement of the lever 18, the said weight by reason of its adjusted position upon the vertical standard 20 will lose part of its leverage as the upper extreme of its movement is approached. At the same time the arms 17, descending to a more horizontal position have an increased leverage with respect to the weight 20. It is found in practice that when a weight of sand or water within the tank 10 has accumulated sufficiently to depress the arms 17 and lift the weighted end of the lever 18, the positive downward movement of the tank increases in momentum due to the loss of leverage by the weight 20 and the increase of the leverage upon the arms 17. This assures a full and complete descent of the tank when it once begins to go down. The upward movement of the lever 18 is limited by an adjustable nut 23 carried upon a screw threaded rod 24, which rises from the frame 11. The lever 18 is provided with an elongated slot 25 for receiving the said rod 24. A second nut 26 limits the downward movement of the said lever 18.

Coöperating with the differential lever support of the tank 10 is a discharge outlet valve mechanism. The lower edge of the casting 15 is provided with a flange to which is secured a similar flange upon the upper edge of a casting 27. The lower edge of said casting 27 is preferably beveled at 28 to form a more or less sharp and thin edge for engaging the valve. Projecting laterally from the outlet casting 27 is a bar 29, the inner end of which is bolted to projections on the casting 27, while the outer end of said bar is supported by upwardly inclined bars 30 which extend to the side walls of the tank 10, and are riveted or otherwise secured thereto. Depending from the bar 29 is a frame adapted to carry a valve lever 31 and a toggle device for controlling the action of said lever. The said frame has parallel hangers 32 at one end between which the lever 31 is pivoted, and a hanger 33 at the other end. Parallel bars 34 are suspended upon the ends of said hangers and spaced apart by the lower end of the hanger 33 and by a bracket 35 which carries one end of the toggle mechanism. The inner end of the valve lever 31 carries a valve 36, the said valve being pivoted upon the lever and being of a proper size and shape to fit against the beveled edge of the casting 27. The opposite end of the lever 31 is provided with an adjustable counterbalance weight 37, which is usually set to almost balance the valve with the load resting thereon. Near the middle portion of the said lever 17 is a depending arm 38, which preferably extends downwardly immediately below the pivot point 39 of the lever. Between the lower end of said lever 38 and the bracket 35 is a toggle device made up of links 40 and 41. The outer ends of the links 40 are pivoted at 42 to the lower end of said arm 38, while the inner ends of said links are preferably spread apart to receive a block 43 having a central vertical aperture therein 44. The outer ends of the links 41 are pivoted to the head 45 of an adjusting bolt 46. Nuts 47 and 48 engaging the threads of said bolt hold the same with respect to the bracket 35. The inner ends of said links 41 are spread apart so as to receive the block 43 and the ends of the arms 40, pivot bolts extending from the said block through both sets of toggle links 40 and 41. From the said toggle device, a rod 49 extends upwardly to the lever 18, to which it is pivoted at 50. The lower end of said rod 49 is screw threaded and passes through the aperture 44 in the block 43. Adjustable tappet nuts 51 and 52 are carried by a screw threaded portion of the rod 49 so as to include the block 43 between them. The said tappets are spread a sufficient distance to permit the lever 18 to rise nearly to its full height before actuating the toggle and opening the valve. The same connection between the parts also permits the tank to descend after discharging any of its contents, nearly to the lower limit of its movement before the toggle mechanism is again actuated for positively closing the valve. The upper tappet nuts 51 are also set so that when they descend, with the lever 18, the toggle links will be carried a little below their level positions and will thus chock or lock the valve in closed position against the action of any weight of material that may be contained within the tank 10. The upward movement of the weighted end of the lever 31 is limited by a block 70 on the outer end of the bar 29.

In the upper part of the tank a distributing member 53 is supported upon bars 54 which extend across the tank from side to side forming a spider to support the said member 53. The said member 53 is preferably slightly conical in shape, the center thereof rising a little above the level of the edge or periphery thereof. The upper surface of said distributing or spreading member 53 is also preferably provided with radially arranged ribs 55, there usually being about six of said ribs although a greater or less number thereof may be used as desired. The falling of water and sand or other materials upon the central portion of said distributing member will cause the same to be spread evenly and carried to the edges of the tank. The discharge outlet for the overflow of water is preferably through an inclined duct or pipe 56, which has an enlarged inlet turned up into vertical position at 57 and is supported at the central portion of the spider formed by the bars 54. The liquid and solid materials, especially when sand and water are delivered into the tank for settling and separation, spread open the member 53 and are carried to the edge portions of the tank 10. The water accumulated in the tank rises and overflows through the pipe 56 carrying all the dirt and lighter portions of foreign materials out with it. The sand will not travel to the center sufficiently to be lifted by the water in passing out of the overflow, for the sand once having descended below the surface of the inlet will continue to descend even though the water rises and passes out of the overflow.

Coöperating with the spreading member 53 is an inlet hopper 58. The said hopper tapers toward an outlet 59 arranged above the apex of the spreading member 53. The upper edge of the hopper 58 has a horizontal launder 60 extending laterally from its upper portion and having outer walls 61 on three sides thereof, extending high enough to prevent the escape of water. One side of said launder is left without a wall so that the overflow materials will fall therefrom into any suitable discharge chute 62.

The water and sand or other materials are delivered into the hopper 58 through an inlet pipe 63. Immediately below this pipe 63 within the hopper is a spreading device 64 having a central ridge portion and sides inclined in opposite directions therefrom to points somewhat near the walls of the hopper 58. Immediately below the spreading device 64 is a water inlet pipe 65, which delivers an auxiliary supply of water immediately beneath the said spreading device. The size of the outlet opening 59 is such that the water entering through the auxiliary supply pipe 65, cannot be accommodated thereby, and said water must rise around the edges of the spreading device 64, thus further washing the sand at this point and carrying the lighter silt and dirt upward and over the launder 60. The sand however will continue to descend even through the upward currents at the edges of the spreader and will pass through the outlet opening 59 with what water it will accommodate. The auxiliary supply of water may be controlled to a nicety by a valve 66 in the pipe 65.

In the operation of the device the materials to be treated as for instance sand are delivered into the apparatus through the inlet pipe 63, a sufficient quantity of water being delivered with it to carry the sand and other materials freely. The tendency of the sand and heavier particles is to drop as soon as it enters the hopper and it passes downwardly over the spreading device 64, at the edges of which it is met by the retarding currents set up by the water from the auxiliary supply pipe 65, with the result that much of the dirt and extraneous matter is separated from the sand at that point, and overflows through the launder 60 into the chute 62. The sand and water then pass through the discharge opening 59 being delivered upon the central portion of the conical member 53. The even spreading of the water in passing over the distributing member 53 is insured by the ribs 55 so that the sand carrying water flows evenly to the outer edges of said spreader. This spreading of the water and sand tends to reduce the speed of the movement in said materials considerably and the retarded motion in the water as the materials drop over the edges of the member 53, gives the sand ample time to drop well into the lower part of the tank before it can be carried very far toward the center thereof. The movement of the water toward the central outlet again tends to increase the speed thereof and it carries all light and floating materials with it through the discharge pipe 56. Any whirling action in the water at this point is prevented by the bars 54 forming the spider that supports the outlet pipe 56. As the sand or heavier material collects in the lower part of the tank 10, it will gradually accumulate a weight therein, which at the proper time will depress the tank against the action of the counterweight 20. As above intimated when the lever 18 is in its lowered or horizontal position the weight 20 has the greatest leverage in supporting the tank 10. As soon as the preponderance of weight in the tank begins to move the tank downwardly, the weight 20 will lose some of its leverage as it is elevated and moved inwardly toward the tank by reason of the inclined position of the rod 21. The momentum of the tank will thus tend to increase until the valve is opened at the bottom and the materials in the tank are discharged. This positively insures the complete descent of the tank to the limit of the movement in the lever 18. When the tank nearly reaches the bottom of its movement the rod 49 will have been raised high enough for the tappets 52 to break the toggle mechanism at its center and permit the toggle links to fold thus opening the valve 36. The weight of sand in the tank and some of the water will pass through the discharge outlet and the discharge of said materials will continue for a short time, or until the tank has been lifted by the counterweight 20 to a point near the upward extremity of its movement. It will be observed that the valve will be held in its open position by the weight of the discharging materials until the toggle is again straightened out by the descent of the lever 18. The chock of the toggle in this position makes the closing of the valve positive and complete, as well as prevents the opening of the valve until the toggle is folded again. The construction and action of this mechanism is very important, for it prevents the more or less constant running of sand and water through the discharge outlet of the tank, the difficulty that has been experienced in settling tanks of this general type heretofore. The running of water through the tank with the sand is thus very materially reduced and the discharge of sand is accompanied with a very small quantity of water.

It should be noted that the weight of materials on the valve, when the valve is in closed position cannot influence the action of the tank upon its counter weight 20, in any way, since the valve is locked in its closed position by the chocking of the toggle links.

The space below the spreader 64 in the hopper 58, with the water supply through the pipe 65 is chiefly employed for maintaining a zone of new clean water below the incoming dirty water, to insure the passing of the sand which is separated from the dirty water, through the said clean water without the dirt following the same into the tank 10 below. By this means the sand is almost entirely cleaned within the hopper 58.

It will be evident that the minor details of construction may be considerably varied and that the mounting and adjustment of the various parts of the mechanism may be considerably altered within the spirit and scope of the invention.

What is claimed is:

1. A settling tank comprising a receptacle movably supported, an outlet valve member, pivoted levers supporting said receptacle and said valve member, counter weights therefor, means for locking the lever of said valve member against movement, whereby to hold said valve member closed, and means operated by the movement of said receptacle lever for controlling said locking means, whereby to automatically lock and unlock the same in the operation of said mechanisms.

2. A settling tank mechanism comprising a receptacle movably supported, a discharge valve member therefor, weighted levers pivotally supporting said receptacle and said valve member, toggle members holding said valve member lever against movement, and operating connections therefrom to said receptacle supporting lever whereby the movement of the latter in opposite directions moves said toggle members into holding and releasing positions, respectively, substantially as described.

3. In a device of the character referred to, a receptacle, a valve member for controlling the discharge opening thereof, means controlled by toggle members for holding said valve member closed, and means controlled by the weight of the matter in said receptacle for operating said toggle members, whereby to release said valve member.

4. A settling tank mechanism comprising a receptacle having a vertical parallel ruler motion, a counterbalance lever supporting said receptacle and having angular supporting arms whereby their leverage is increased upon the depression of the receptacle and a counterbalance weight carried by said lever and arranged so that its leverage upon the supporting lever decreases as the receptacle is depressed.

5. A settling tank mechanism comprising a receptacle having a discharge opening, a valve controlling said outlet, toggle mechanism adapted when straightened to lock said valve in closed position and when folded to open said valve, and means operated by the accumulation of material in the receptacle to fold the toggle mechanism.

6. A settling tank mechanism comprising a receptacle having a discharge outlet at the bottom, a forked lever supporting said tank and having its tank supporting ends bent upward with respect to the lever from the fulcrum thereof, a counterbalance mounted upon said lever and extending at an angle thereto, the arrangement of the lever and weight being such as to secure a differential action in the leverage exerted upon the receptacle, a valve mechanism for closing the discharge outlet and connecting means interposed between said valve mechanism and the receptacle supporting lever whereby the valve will be opened or closed only at the extremes of the movement of said receptacle.

7. A settling tank mechanism comprising a receptacle, a lever fulcrumed adjacent to said receptacle for supporting its weight, a counterbalance weight upon said lever, a counterbalanced valve engaging the discharge opening of the receptacle, a toggle mechanism controlling the movement of said valve for positively opening and closing the same and a member connecting the toggle mechanism with the receptacle supporting lever whereby the valve will be operated in accordance with the movement of said lever.

8. A settling tank mechanism comprising a tapered receptacle having an outlet mouth at the bottom, a counterbalanced lever movably supporting said receptacle, a valve adapted to engage the outlet mouth, a lever pivotally mounted upon the receptacle and connected to the valve, a counter weight therefor and toggle links adapted to lock and hold said valve lever, or to fold for opening the valve, a tappet carrying rod adapted to operate the said toggle links, the said rod being connected with the counter balance lever of the receptacle and means for movably holding the receptacle in vertical position.

9. A settling tank mechanism comprising a receptacle, a lever pivotally supporting said receptacle, a weight, means adjustably connecting said weight to said lever, said weight being movable at an angle to and from said lever, and means for limiting the movement of said supporting lever on its pivot.

10. A settling tank mechanism comprising a material receiving receptacle, a counter weight mechanism movably supporting the receptacle, a discharge controlling valve operating in conjunction therewith, a toggle device for controlling the opening and closing of the valve having a perforated member, an operating rod extending through said member and having adjustable tappets upon each side of said member and means for connecting the said rod with the receptacle counter weight mechanism, the structure being such that the valve will remain closed until the tank is depressed by weight of materials therein, and will be positively closed and locked in closed position after the materials have been discharged from said receptacle.

11. A settling tank mechanism comprising a material receiving trough having an automatically controlled discharge outlet, means for discharging the materials to be treated in the said tank, a spreading member adapted to spread and retard the movement of the materials entering the tank and a discharge outlet for the liquid portions of the materials arranged beneath said spreader near the central portion thereof whereby the outlet flow of liquids will be increased in speed, for holding the lighter material in suspension after the depositing of the solid materials within the tank, and converging partition means leading to the said outlet and preventing a whirling action in the discharging liquids.

In testimony whereof I have hereunto set my hand in presence of two witnesses.

WALTER E. SAXE.

Witnesses:
DANIEL P. KENDRICK,
CASSELL SEVERANCE.

Copies of this patent may be obtained for five cents each, by addressing the "Commissioner of Patents, Washington, D. C."